March 7, 1933.  W. STANIEWICZ  1,900,773
MOTOR VEHICLE
Filed March 13, 1930
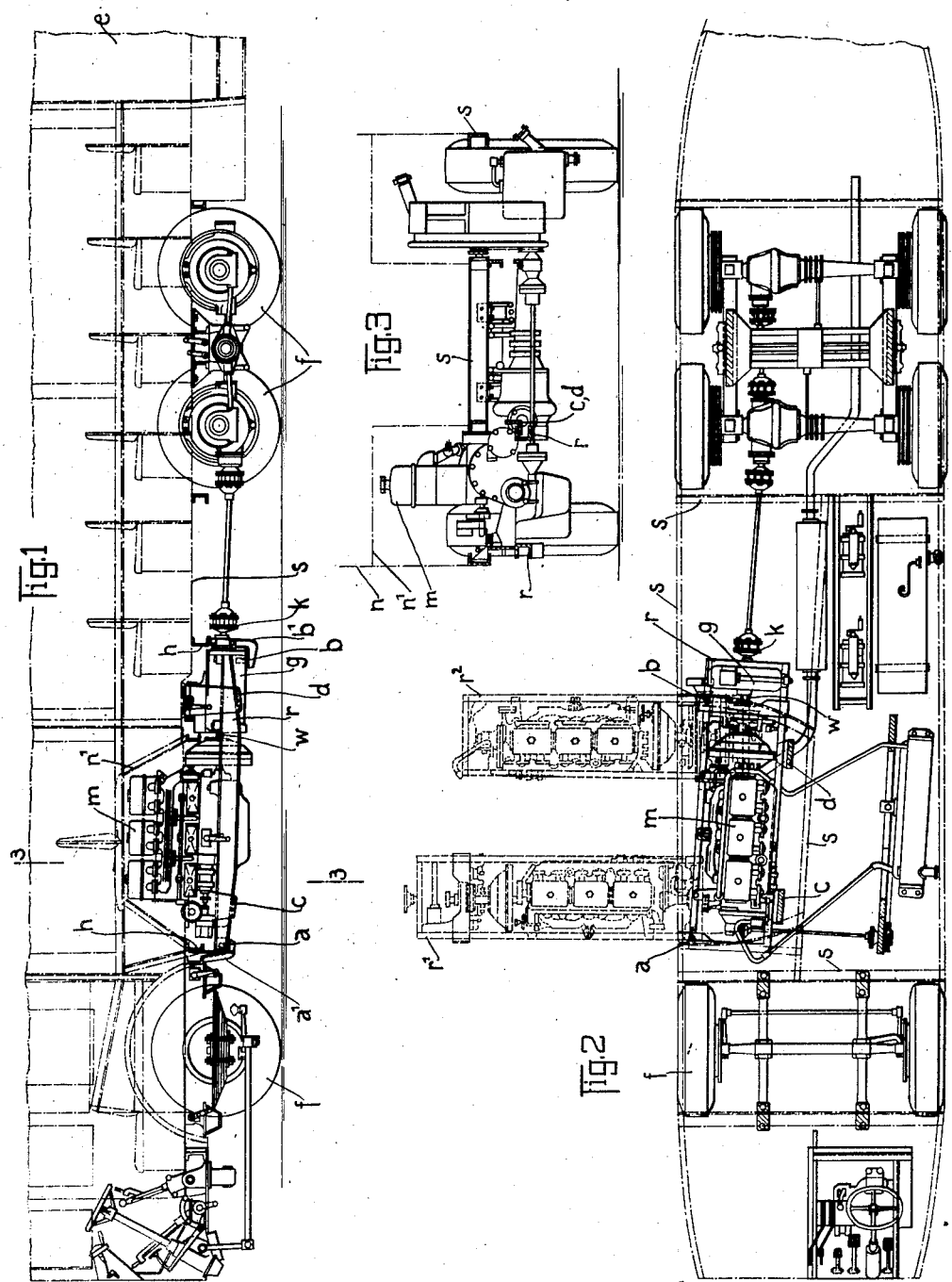
Inventor,
Willy Staniewicz,
by F.W. Dahn,
Attorney.

Patented Mar. 7, 1933

1,900,773

UNITED STATES PATENT OFFICE

WILLY STANIEWICZ, OF BRUNSWICK, GERMANY, ASSIGNOR TO AUTOMOBILWERKE H. BÜSSING, AKTIENGESELLSCHAFT, OF BRUNSWICK, GERMANY

MOTOR VEHICLE

Application filed March 13, 1930, Serial No. 435,518, and in Germany April 16, 1929.

I have filed an application for patent in Germany, dated Apr. 16, 1929.

My invention relates to improvements in motor vehicles, and the object of the improvements is to provide a motor vehicle in which the motor and the gearing directly connected therewith can be readily examined. With this object in view my invention consists in mounting the motor and the parts of the gearing connected therewith on a subsidiary frame which is movably connected with the frame or body of the vehicle, so that it can be readily moved out of normal position into position for allowing inspection of the motor and gearing. In the preferred construction the said subsidiary frame is mounted on the main frame so as to be rockable on a vertical pivot bolt, the said pivot bolt being preferably located at one end of the subsidiary frame, and the subsidiary frame being located at the side of the vehicle. In the embodiment of the invention described hereinafter the subsidiary frame is mounted at both ends on vertical pivot bolts, and it is adapted to be rocked about either one of said pivot bolts for rocking either end outwardly.

For the purpose of explaining the invention an example embodying the same has been shown in the accompanying drawing, in which the same letters of reference have been used in all the views to indicate corresponding parts. In said drawing Fig. 1 is an elevation partly in section showing a bus, Fig. 2 is a top plan view of Fig. 1 partly in section, and Fig. 3 is a sectional elevation taken on the line 3—3 of Fig. 1.

In the example shown in the figures the vehicle comprises a body $e$ mounted on a frame $s$ and supported on wheels $f$. On brackets $a^1$ and $b^1$ secured to channel irons $h$ forming parts of the frame vertical pivot bolts $a$ and $b$ are mounted, and on the said brackets and pivot bolts a subsidiary frame $r$ is supported, additional brackets $c$ and $d$ being secured to the frame of the vehicle for providing loose supports for the frame $r$. On the subsidiary frame $r$ the motor $m$, a part $g$ of the gearing and the motor shaft $w$ are mounted. The subsidiary frame is adapted to be disconnected from one of the pivot bolts $b$, so that it can be rocked outwardly about the other one of the pivot bolts into the positions shown in Fig. 2 in dotted lines and indicated by the reference characters $r^1$ and $r^2$. Before rocking the subsidiary frame and the motor into the said positions the universal joint $k$ is disconnected. By rocking the subsidiary frame the motor and other parts mounted on the said frame are readily accessible.

In the construction shown in the figures the cylinders of the motor $m$ extend into the body of the vehicle at $n$ (Fig. 3), and in order to permit the same to be rocked outwardly with the subsidiary frame, the body is provided with a recess $n^1$.

By disposing pivot bolts $a$ and $b$ at both ends of the subsidiary frame $r$ either end of the cylinder can be rocked outwardly so that the parts mounted thereon can be inspected.

I claim:

1. A motor vehicle, comprising a body, a subsidiary frame mounted on said body for lateral swinging movement outwardly relatively to said body, pivot means on the body for supporting the frame during such movement, a motor mounted on said frame, and driving gearing connected with said motor, said motor and driving gearing being movable bodily with said frame.

2. A motor vehicle, comprising a body, a subsidiary frame mounted on said body, vertical pivot bolts connecting said subsidiary frame at both ends with said body, said subsidiary frame being adapted to be disconnected from either one of said pivot bolts and then swung laterally to project outward from said body, a motor mounted on said subsidiary frame, and driving mechanism connected with said motor for movement with said frame.

3. A motor vehicle, comprising a body, a subsidiary frame mounted on said body at the side thereof for rocking movement outwardly therefrom, a motor mounted on said frame, and driving gearing connected with said motor, said motor and gearing moving with the frame into position outside the confines of the vehicle body.

4. A motor vehicle comprising a wheeled body, a subsidiary frame mounted on the body for pivotal movement outwardly from the body, an internal combustion engine fixed on the subsidiary frame and movable bodily therewith to a position substantially outside the confines of the body, means connecting the engine to the driving wheels of the car including gearing on the subsidiary frame, a shaft on said frame, a transmission shaft connected to said driving wheels, and a connection between said shafts adapted to be disconnected to permit outward movement of said auxiliary frame.

5. A motor vehicle comprising a body, a subsidiary frame mounted on the body for movement in a substantially horizontal plane laterally outwardly from the body, a pivot on the body about which pivot said subsidiary frame swings into relatively accessible position, and a motor on the subsidiary frame for driving the vehicle.

6. A motor vehicle comprising a body, a subsidiary frame mounted on the body for pivotal movement outwardly from the body, a motor on the subsidiary frame movable therewith to a position substantially outside the confines of the body, a transmission shaft for driving the vehicle, mechanical connections from the motor to said transmission shaft including a shaft on the subsidiary frame, gearing on the subsidiary frame connecting the motor to said last-named shaft, and disconnectable means connecting the two shafts.

In testimony whereof I affix my signature.

WILLY STANIEWICZ.